(No Model.)  2 Sheets—Sheet 1.

L. F. HAUBTMAN.
DEFECATOR FOR CANE JUICE.

No. 335,352. Patented Feb. 2, 1886.

WITNESSES:
Chas. Nida
C. Sedgwick

INVENTOR:
L. F. Haubtman
BY Munn & Co
ATTORNEYS.

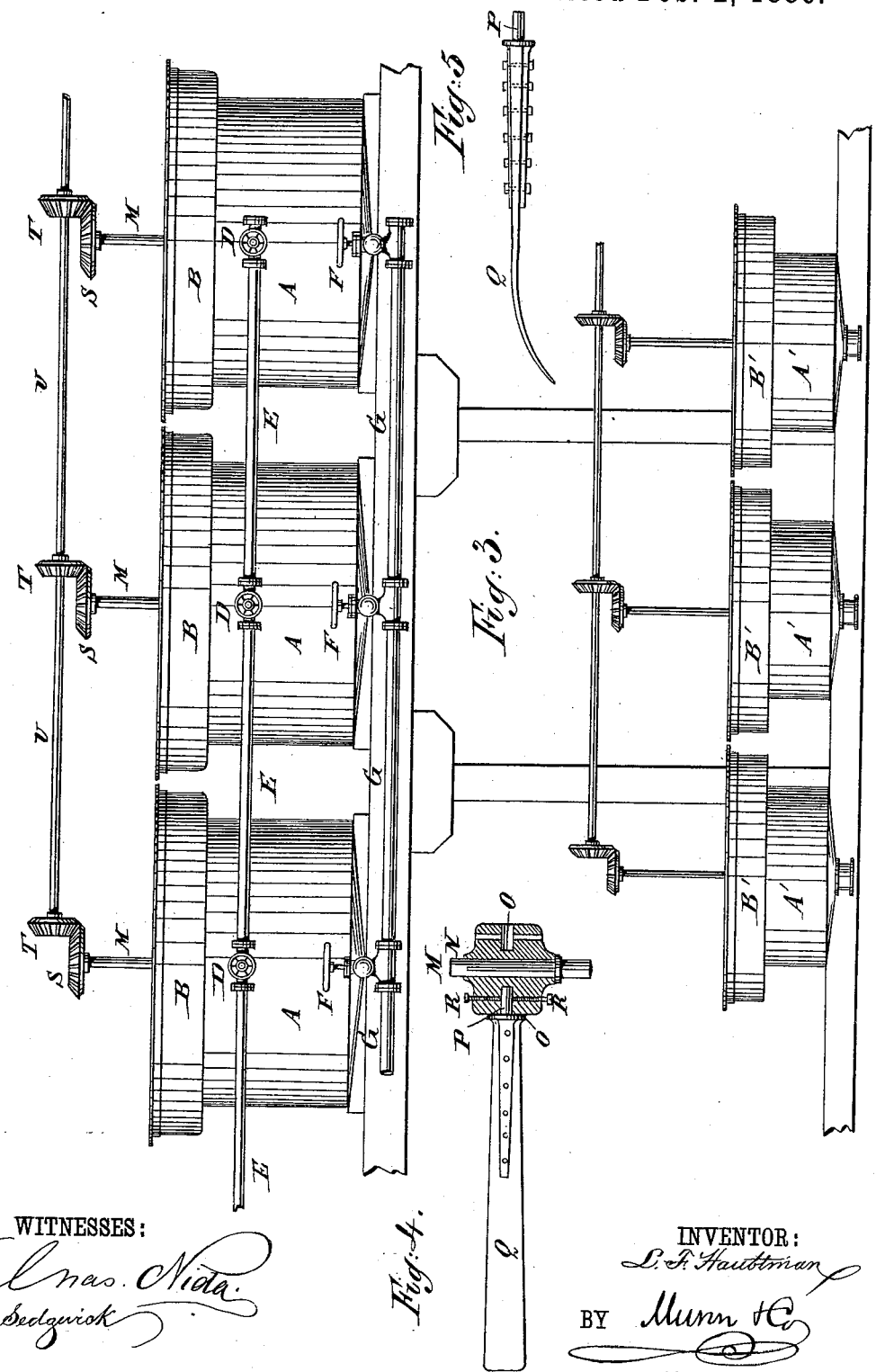

UNITED STATES PATENT OFFICE.

LEON F. HAUBTMAN, OF NEW ORLEANS, LOUISIANA.

DEFECATOR FOR CANE-JUICE.

SPECIFICATION forming part of Letters Patent No. 335,352, dated February 2, 1886.

Application filed October 20, 1885. Serial No. 180,431. (No model.)

*To all whom it may concern:*

Be it known that I, LEON F. HAUBTMAN, of New Orleans, in the parish of Orleans and State of Louisiana, have invented a new and useful Improvement in Defecators for Cane-Juice and other Liquids, of which the following is a full, clear, and exact description.

Reference is to be had to the accompanying drawings, forming a part of this specification, in which similar letters of reference indicate corresponding parts in all the figures.

Figure 1:
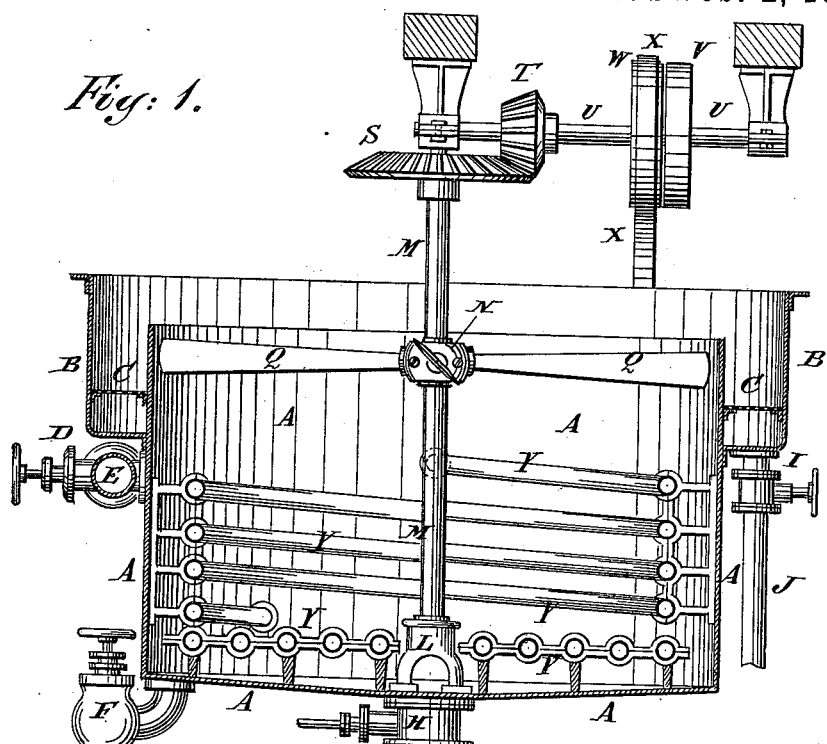
Figure 2:
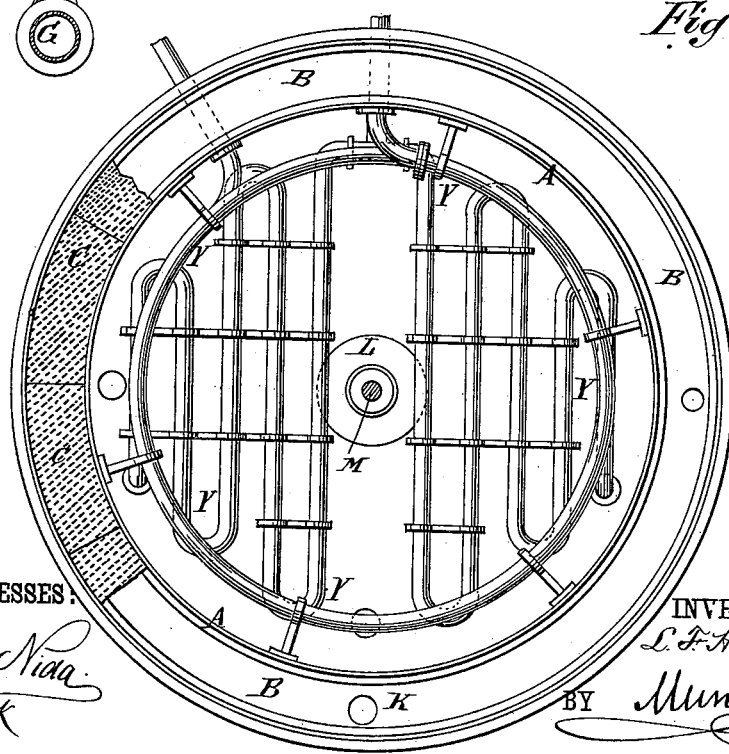

Figure 1, Sheet 1, is a sectional side elevation of one of my improved defecators. Fig. 2, Sheet 1, is a plan view of the same, the skimmer-shaft being shown in section, and part of the scum-screen being removed. Fig. 3, Sheet 2, is a front elevation of a series of defecators, and showing a series of smaller defecators set at a lower level. Fig. 4, Sheet 2, is a side elevation of a skimming-paddle and a part of the skimmer-shaft, the paddle hub being shown in section. Fig. 5, Sheet 2, is an edge view of one of the skimming-paddles.

The object of this invention is to provide defecators constructed in such a manner that the scum will be removed automatically, and that the valuable parts of the impurities can be readily preserved and again defecated.

The invention consists in the construction and combination of various parts of the defecator, as will be hereinafter fully described, and then pointed out in the claims.

A indicates a cylindrical vessel, of iron, copper, or other suitable material, and which may be of any desired size. Around the top of the vessel A is formed an annular trough, B, the wall of which rises higher than the wall of the vessel A. The trough B is provided with a screen, C, of wire-gauze, perforated sheet metal, or other suitable material, and which is placed at a little distance above the bottom of the said trough.

In the upper part of the side of the vessel A is formed an inlet-opening closed by a valve, D, connected with a feed-pipe, E, through which the cane-juice or other liquid is introduced into the said vessel A. The bottom of the vessel A is concaved, and in the side part of the said bottom is formed an opening closed by a valve, F, through which the clarified liquid is drawn off into the discharge-pipe G, and conducted to a suitable receiver. In the center of the concave bottom of the vessel A is formed an opening closed by a valve, H, through which the heavier impurities can be drawn off, which impurities naturally settle into the lowest part of the vessel A. The liquid that passes into the trough B with the scum, and that passes through the screen C, can be drawn off through the valve I and pipe J. The scum can be afterward removed through another opening, K, in the bottom of the trough B, and which is also closed by a valve. (Not shown in the drawings.)

To the middle part of the concave bottom of the vessel A is secured a spider, L, in a socket in which revolves the lower end of a vertical shaft, M. The upper end of the shaft M revolves in a bearing attached to the frame of the building or other suitable support, or in a bracket attached to the said support.

To the shaft M, at or near the level of the top of the vessel A, is secured, by a groove and key or other suitable means, a hub, N, in which are formed four (more or less) radial sockets, O, to receive round tenons P, formed upon or secured to the shanks of the paddles Q. The paddles Q can be made straight or curved, as shown in Fig. 5, or of any other desired or suitable shape, and are secured in the sockets of the hub N by set-screws R, so that the said paddles can be readily adjusted.

To the upper end of the shaft M is attached a beveled gear-wheel, S, into the teeth of which mesh the teeth of the beveled gear-wheel T, attached to a horizontal shaft, U. The shaft U revolves in brackets or hangers attached to the frame of the building or other suitable support, and is provided with a loose pulley, V, and a fast pulley, W, to receive a driving-belt, X.

In using the defecator the vessel A is filled with cane-juice or other liquid through the pipe E and valve D, and heat is applied by means of coils, Y, of steam-pipe placed in the said vessel. As the scum begins to rise, the paddles Q are set in motion and sweep the scum over the edge of the vessel A into the trough B, where the juice carried over by the said scum drains through the screen C into the lower part of the said trough, while the scum remains upon the said screen. When the scum that rises becomes white, the liquid is drawn off through the valve F and pipe G, and the heavier impurities or settlings are drawn off through the valve H. The liquid from the trough B and the heavier impurities from the concave bottom of the vessel A can be conducted into a smaller defecator, A', placed at a lower level than the defecator A, and provided with an annular trough, B', and the other appliances, as described with reference to the defecator A, but all of which are not shown in the drawings.

In Fig. 3 are shown a series of three larger defecators connected with the same feed-pipe and with the same driving-shaft, and a series of three smaller defecators placed at a lower level than the larger defecators, and connected with the same driving-shaft. The latter are to be used to work over the skimmings and settlings forming from the cane-juice during the operation.

Having thus described my invention, I claim as new and desire to secure by Letters Patent—

1. In a defecator, the metallic vessel A, constructed substantially as herein shown and described, with a circular trough around its top and with a concave bottom, as set forth.

2. In a defecator, the combination, with the vessel A, having an annular trough, B, around its top, of the vertical shaft M, the radial paddles Q, connected with the said shaft, and a driving mechanism, substantially as herein shown and described, whereby the scum will be removed from the said vessel automatically, as set forth.

3. In a defecator, the combination, with the scum-receiving trough B, connected with the top of the vessel A, of the screen C, substantially as herein shown and described, whereby the liquid carried into the said trough will be separated from the said scum, as set forth.

4. The combination, with a series of large defecating-vessels, of a series of similar small defecating-vessels, substantially as herein shown and described, to receive and defecate the liquid separated from the scum and the liquid drawn off with the heavy impurities, as set forth.

5. In a defecator, the combination, with the vertical shaft M and the paddles Q, having round tenons P, of the hub N, having radial sockets O, to receive the tenons of the said paddles, and the set-screws R, for securing the said tenons in place, substantially as herein shown and described, whereby the said paddles can be readily adjusted, as set forth.

LEON F. HAUBTMAN.

Witnesses:
MICHEL V. DESANG,
JOHN McCOFFREY, Jr.